United States Patent
Anbananthan

(10) Patent No.: US 8,909,029 B2
(45) Date of Patent: Dec. 9, 2014

(54) CAPTURING PLAYBACK KEY EVENTS IN BD PLAYERS

(75) Inventor: Saravana Prabhu Anbananthan, Los Angeles, CA (US)

(73) Assignees: Sony Corporation, Tokyo (JP); Sony Pictures Technologies Inc., Culver City, CA (US)

( * ) Notice: Subject to any disclaimer, the term of this patent is extended or adjusted under 35 U.S.C. 154(b) by 721 days.

(21) Appl. No.: 12/904,087

(22) Filed: Oct. 13, 2010

(65) Prior Publication Data

US 2012/0093479 A1 Apr. 19, 2012

(51) Int. Cl.
*H04N 9/80* (2006.01)
*G11B 19/02* (2006.01)

(52) U.S. Cl.
CPC .................................... *G11B 19/02* (2013.01)
USPC .......................................... 386/248; 386/234

(58) Field of Classification Search
USPC ................. 386/234, E05.002, 248
See application file for complete search history.

(56) References Cited

U.S. PATENT DOCUMENTS

| | | | |
|---|---|---|---|
| 6,609,253 B1 * | 8/2003 | Swix et al. ................... 725/88 |
| 2007/0286575 A1 | 12/2007 | Oashi et al. | |
| 2008/0178296 A1 | 7/2008 | Lemmers | |
| 2009/0060476 A1 * | 3/2009 | Iwamoto et al. ............... 386/126 |
| 2009/0103895 A1 * | 4/2009 | Yahata et al. .................... 386/96 |
| 2010/0202278 A1 * | 8/2010 | Ikeda et al. ................ 369/275.3 |

FOREIGN PATENT DOCUMENTS

| | | |
|---|---|---|
| CN | 1751509 A | 3/2006 |
| CN | 1839631 A | 9/2006 |
| CN | 101501644 A | 8/2009 |
| CN | 10542622 A | 9/2009 |
| JP | 2007080400 A | 3/2007 |

OTHER PUBLICATIONS

Watershade.net, Unofficial OPPO BDP-83 Frequently Asked Questions, AVSForum, Oct. 19, 2009, accessed at http://watershade.net/wmcclain/BDP-83-faq.html#does-the-player-resume-at-the-last-position-when-adisc-is-reloaded, 54 pages.

* cited by examiner

*Primary Examiner* — Thai Tran
*Assistant Examiner* — Girumsew Wendmagegn
(74) *Attorney, Agent, or Firm* — Procopio, Cory, Hargreaves & Savitch LLP

(57) ABSTRACT

Capturing playback key events to override a default behavior of key strokes during playback, includes: receiving a user operation initiated by a user; receiving a notice that a non-default behavior of the key strokes is being masked; notifying the user that there are adverse consequences of overriding the default behavior of the key strokes; and overriding the default behavior of the key strokes. Keywords include User Operation Mask Table and Playback Key Events.

19 Claims, 4 Drawing Sheets

CAPTURING PLAYBACK KEY EVENTS IN BD PLAYERS

BACKGROUND

1. Field of the Invention

The present invention relates to Blu-ray disc players, and more specifically, to capturing playback key events in such Blu-ray disc players to override the default behavior of key strokes.

2. Background

Blu-ray disc (BD) is an optical disc format that provides a storage capacity required for storing an entire feature movie in high definition (HD) quality. The format also supports using data from local storage devices such as a hard disc or flash memory. Additional content of a title (e.g., a movie) can be downloaded and stored in the local storage area of the player. Examples of additional content include subtitle languages, trailers of sequels, director comments, and the like.

The Blu-ray data structure model describes how the actual data is stored on a disc and includes four layers of abstraction: Index table, Movie object/BD-J object, Movie PlayList and Clip.

A Clip includes a Clip Audio/Video (AV) Stream together with associated Clip Information. The Clip AV Stream includes the movie data while the associated Clip Information includes descriptive metadata. A Clip AV Stream is a BD-ROM specific variant of an MPEG-2 Transport Stream (i.e., MPEG-2 TS). An MPEG-2 TS is a multiplexed stream of elementary streams including audio, video or subtitle streams. The BD-ROM AV specification defines which stream types are allowed in the BD-ROM specific variant of MPEG-2 TS. Each elementary stream is assigned a unique identifier called the Package Identifier (PID) which is used to distinguish the different elementary streams in the Transport Stream.

The actual sequences of playable movie clips are stored in PlayLists which are a sequence of PlayItems. A PlayItem is a time interval (defined by two timestamps marking the beginning and ending of the PlayItem in a Clip) in a particular AV stream.

BD-J and Movie Objects include links to one or more PlayLists. The active application controls which PlayList is called at a specific time. A Movie object uses navigation commands such as play and jump to control PlayLists.

SUMMARY

The present invention provides for capturing playback key events to override a default behavior of key strokes during playback.

In one implementation, a method of capturing playback key events is disclosed. The method includes: receiving a user operation initiated by a user; receiving a notice that a non-default behavior of the key strokes is being masked; notifying the user that there are adverse consequences of overriding the default behavior of the key strokes; and overriding the default behavior of the key strokes.

In another implementation, a system configured to capture playback key events is disclosed. The system includes: a user event manager configured to manage the playback key events generated by a user; and a key event capture module configured to receive a notice that a non-default behavior of the key strokes is being locked out, and to notify the user that there are adverse consequences for overriding the default behavior, the key event capture module operating to instruct the user event manager to override the default behavior of the key strokes.

In a further implementation, a non-transitory tangible storage medium storing a computer program for capturing playback key events is disclosed. The computer program includes executable instructions that cause a computer to: receive a user operation initiated by a user; receive a notice that a non-default behavior of the key strokes is being masked; notify the user that there are adverse consequences of overriding the default behavior of the key strokes; and override the default behavior of the key strokes.

Other features and advantages of the present invention will become more readily apparent to those of ordinary skill in the art after reviewing the following detailed description and accompanying drawings.

DETAILED DESCRIPTION

Certain implementations as disclosed herein provide for capturing playback key events in Blu-ray disc (BD) players to override the default behavior of key strokes. After reading this description it will become apparent how to implement the invention in various implementations and applications. However, although various implementations of the present invention will be described herein, it is understood that these implementations are presented by way of example only, and not limitation. As such, this detailed description of various implementations should not be construed to limit the scope or breadth of the present invention.

Figure 1:
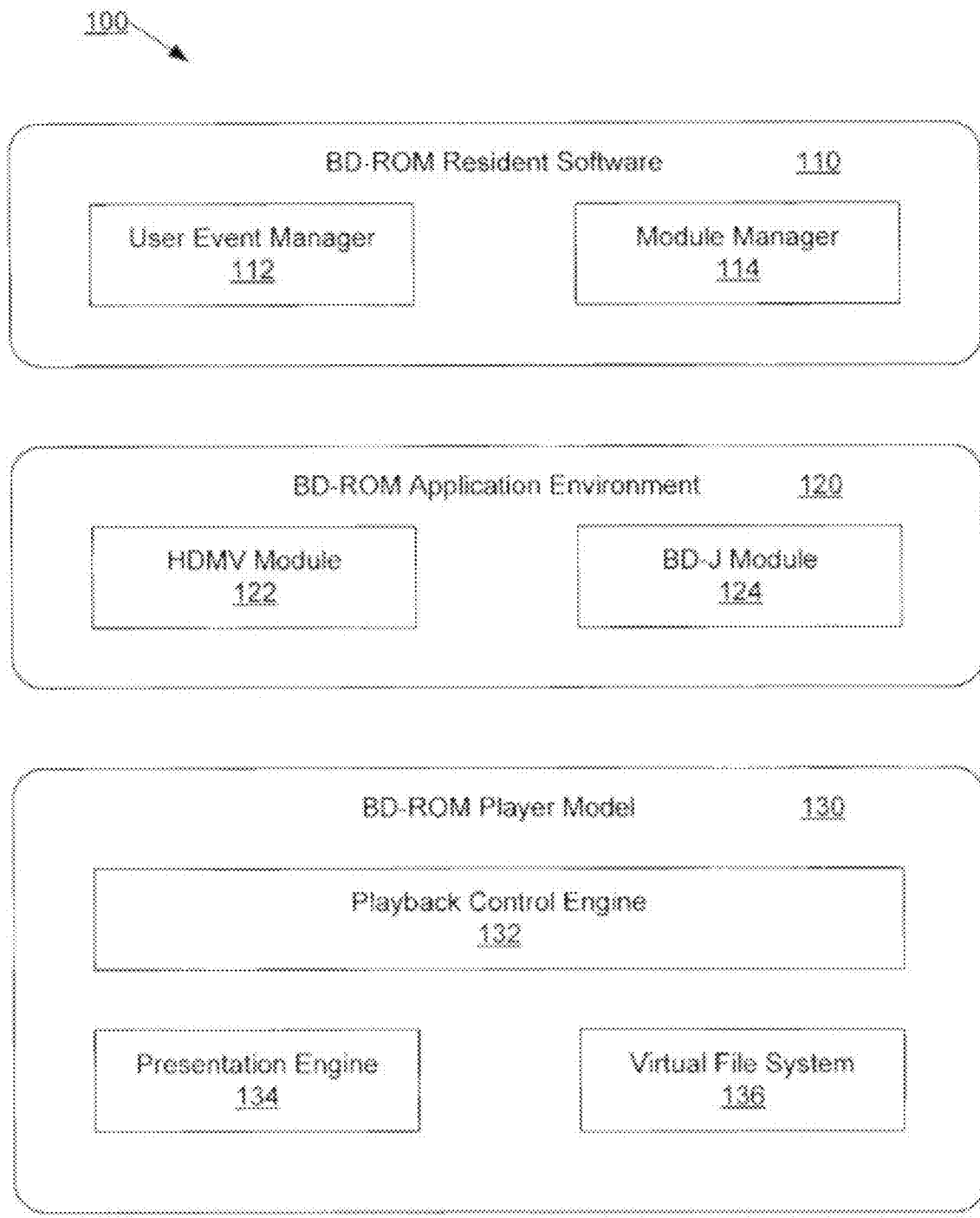
FIG. 1 shows a Blu-ray disc system model as an application-oriented model divided into three layers.

FIG. 1 shows a Blu-ray disc system model 100 as an application-oriented model divided into three layers: Blu-ray Disc Read Only (BD-ROM) resident software 110, BD-ROM application environment 120, and BD-ROM player model 130. The BD-ROM application environment 120 includes an HDMV Module 122 and a BD-J Module 124. The BD-ROM player model layer 130 includes three blocks: a virtual file system (VFS) 132, a presentation engine 134 and a playback control engine 136. The playback control engine 136 controls the actual video playback.

The BD-ROM resident software layer 110 includes a module manager 114 and a user event manager 112. The module manager 114 manages the lifecycle of the actual applications. The user event manager 112 manages user-generated events. The user-generated events are interactions between the user and the Blu-ray disc player. A typical interaction, for example, includes remote control button pushes. In response, the user event manager generates either a user operation or a key event. Examples of user-generated events include simple commands such as play, stop, fast forward, skip but also include more advanced commands such as changing the active subtitle language or audio track.

As mentioned above, the playback control engine 132 controls the actual video playback and the user event manager manages user-generated events during the playback. In some situations, however, it is desirable to prohibit certain user-generated events or key events during the playback.

To restrict the allowed user operations during the playback, the playback control engine uses so called user operation masks to prohibit non-default behavior of the key strokes during the playback. A user operation mask is a table listing all allowed user operations. These tables can be used at three different places in the Blu-ray format: (1) In the PlayList structure, the tables prohibit actions during playback of the PlayList; (2) In the PlayItem structure, the tables prohibit actions during playback of the PlayItem; (3) During usage of HDMV Interactive Graphics, the tables prohibit actions of the interactive graphics. Therefore, the playback control engine does not provide for overriding the default behavior of key strokes of the video playback because the user operation mask structure locks out non-default behavior. For example, the playback control engine can be used to prohibit skipping copyright notifications at the beginning of a movie.

There is a mode of title operation in a BD player referred to as 'Movie Title'. In this mode, the playback keys (e.g., Play, Fast forward, rewind, and chapter next) directly control the playback control engine. Further, in this mode, the playlist elapsed time is displayed on the player front panel. However, in this mode, there is no simple method of overriding the default behavior of these keys or capturing them for notifying the program of that event using Java code.

There is another mode of title operation referred to as 'interactive title' which allows the user to override several playback control keys or be notified when the respective key is pressed. However, the semantics of that mode, like the lack of front panel display of elapsed time, make it an unsuitable mode for a main feature playback.

While the interactive titles satisfy a wide range of use cases, there are situations where the movie titles are preferred. For example, a linear play of a main program is almost always executed as a movie title. Thus, the users have been accustomed to using movie titles for the main program. Any full length interactive games or special features that run on top of the main program are therefore preferred to be movie titles. However, such experiences are usually tied to the timeline of the feature and hence non-linear navigation is either not permitted or needs to be overridden by Java code to provide a specific experience. Accordingly, although it is desirable to prohibit certain key events during the playback, in certain other situations, it is also desirable to override the prohibition of these key events.

Figure 2:
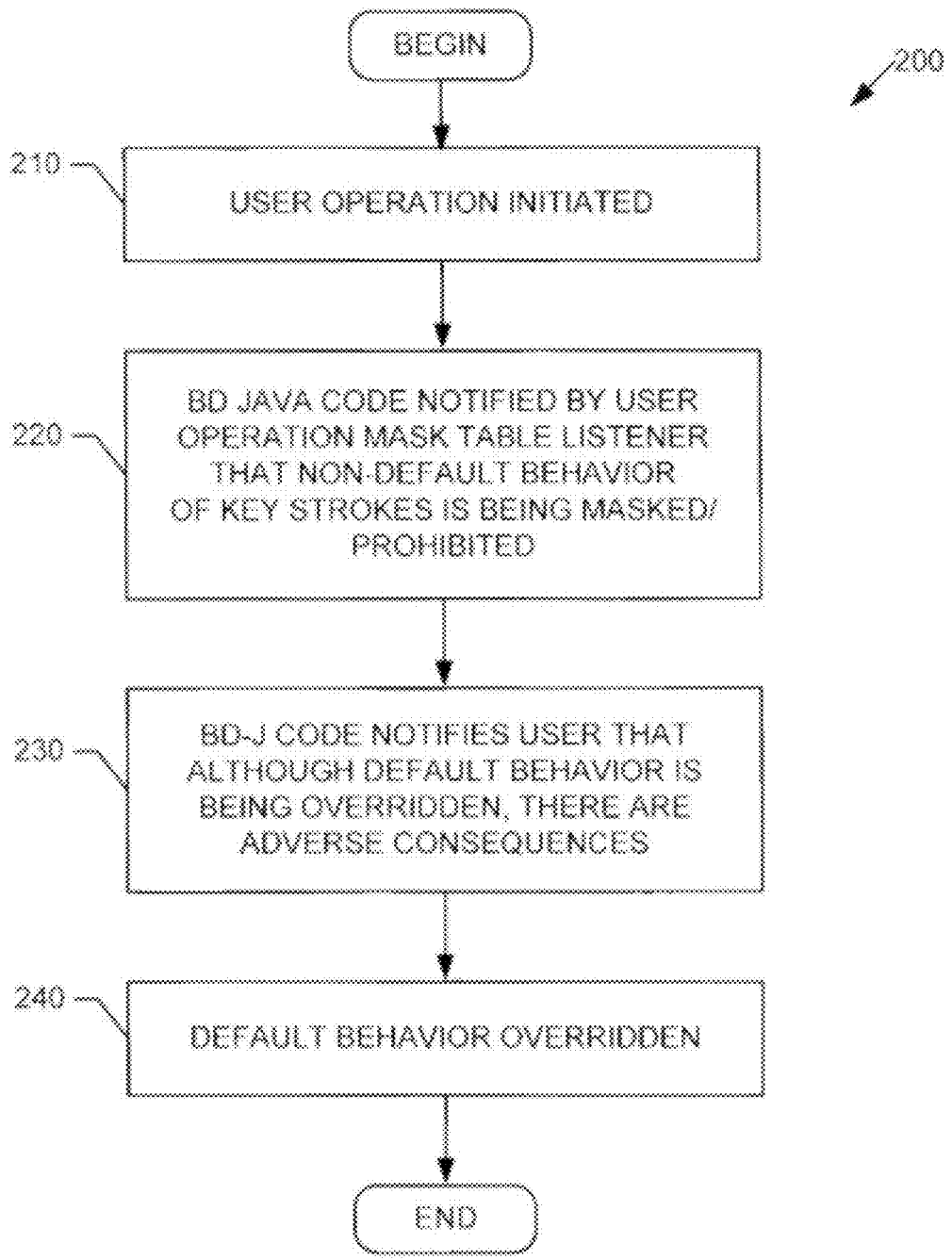
FIG. 2 is a flowchart illustrating a technique for capturing playback key events in movie titles running under BD-J mode to override the default behavior of key strokes in accordance with one implementation of the present invention.

FIG. 2 is a flowchart 200 illustrating a technique for capturing playback key events in movie titles running under BD-J mode to override the default behavior of key strokes in accordance with one implementation of the present invention. In the illustrated implementation of FIG. 2, a user operation is initiated, at box 210. As discussed above, examples of user operations/key events include simple commands such as play, stop, fast forward, skip but also include more advanced commands such as changing the active subtitle language or audio track.

The non-default behavior of key strokes during the video playback is prohibited by the playback control engine because the user operation mask table structure locks out the non-default behavior. However, at box 220, the BD-J code is notified of the lock out event by the user operation mask table listener. The BD-J code in turn notifies the user, at box 230, that although the default behavior is being overridden, there are adverse consequences for overriding the default behavior.

For example, in a game being played over a movie, when a player uses fast forward button to advance through the game, this non-default behavior of the key stroke (i.e., pressing of a fast forward key) is normally prohibited to prevent cheating. Thus, when the BD-J code is notified of the lock out event, the BD-J code notifies the player that the default behavior of the fast forward will be overridden but that there may be adverse consequences for overriding the default behavior (during the game play) of the fast forward. Examples of adverse consequences include no points for achieving certain goals or no rewards for finishing earlier because the player fast forwarded during the game play. The default behavior is then overridden, at box 240.

Figure 3:
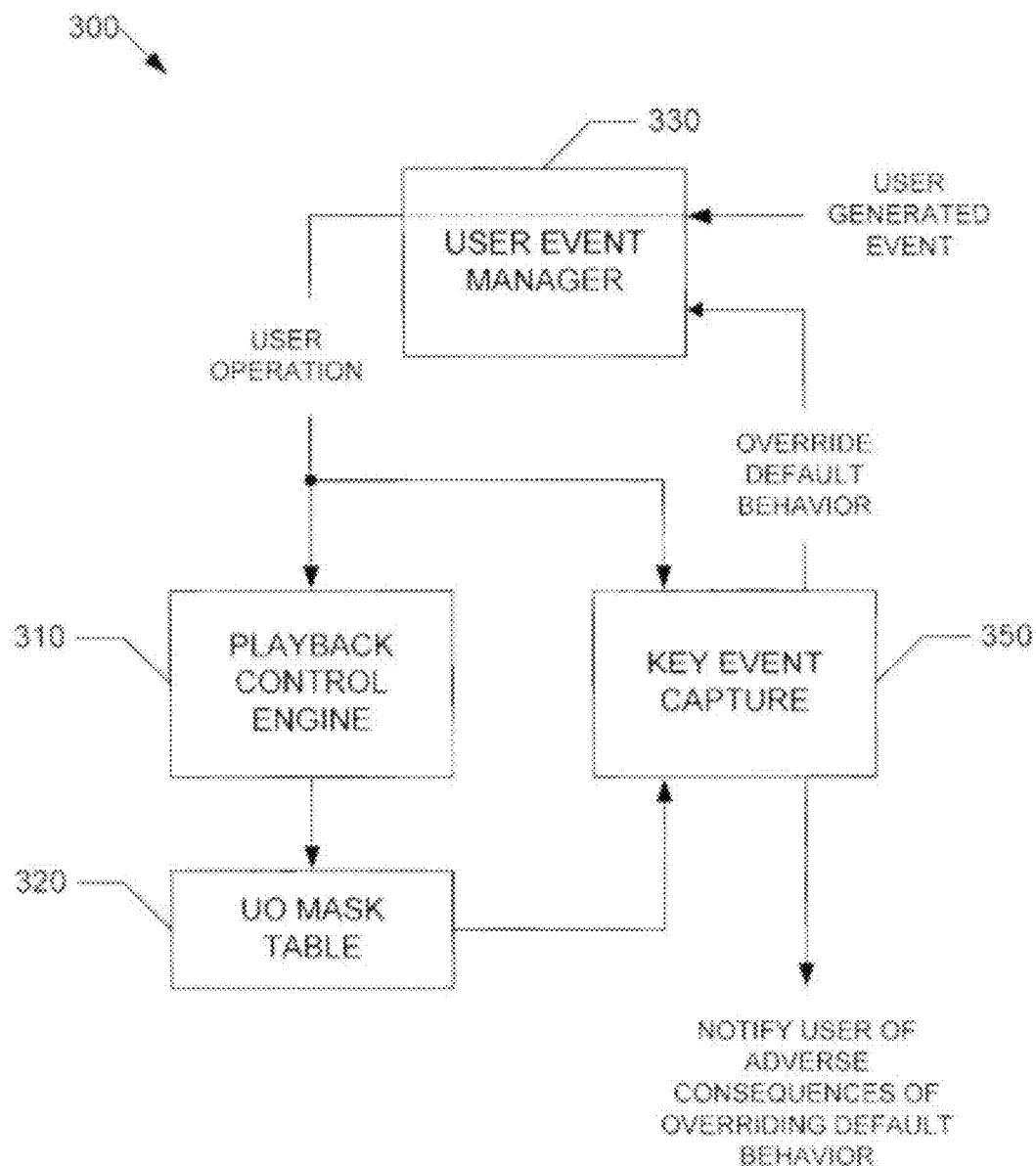
FIG. 3 is a block diagram of a key event capture system configured to capture playback key events in movie titles running under BD-J mode to override the default behavior of key strokes.

FIG. 3 is a block diagram of a key event capture system 300 configured to capture playback key events in movie titles running under BD-J mode to override the default behavior of key strokes including a key event capture module 350. The system 300 includes a playback control engine 310, a user operation mask table 320, a user event manager 330, and the key event capture module 350. In the illustrated implementation of FIG. 3, the user event manager 330 manages user-generated events (e.g., button pushes on a remote control), and generates either a user operation or a key event. The user operation/key event is then received at the playback control engine 310 and the key event capture module 350. As discussed above, examples of user operations/key events include simple commands such as play, stop, fast forward, skip but also include more advanced commands such as changing the active subtitle language or audio track.

The playback control engine 310 prohibits the non-default behavior of key strokes during the video playback using the user operation mask table 320 which locks out the non-default behavior. The key event capture module 350 is notified of the lock out event by a listener of the user operation mask table 320. The key event capture module 350 in turn notifies the user that although the default behavior is being overridden, there are adverse consequences for overriding the default behavior. The key event capture module 350 also instructs the user event manager 330 to override the default behavior of the key strokes.

Figure 4A:
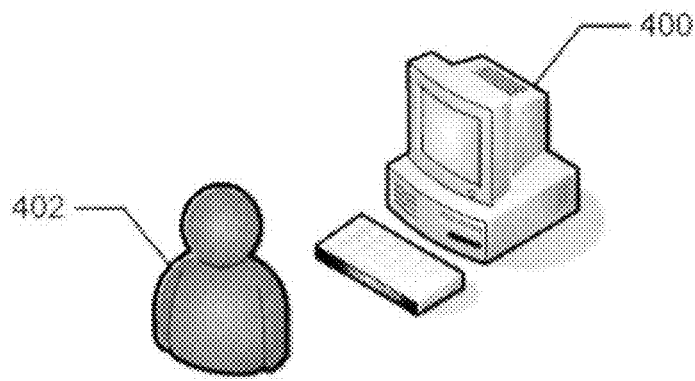
FIG. 4A illustrates a representation of a computer system and a user.

FIG. 4A illustrates a representation of a computer system 400 and a user 402. The user 402 uses the computer system 400 to capture playback key events in movie titles running under BD-J mode to override the default behavior of key strokes. The computer system 400 stores and executes a key event capture system 490.

Figure 4B:
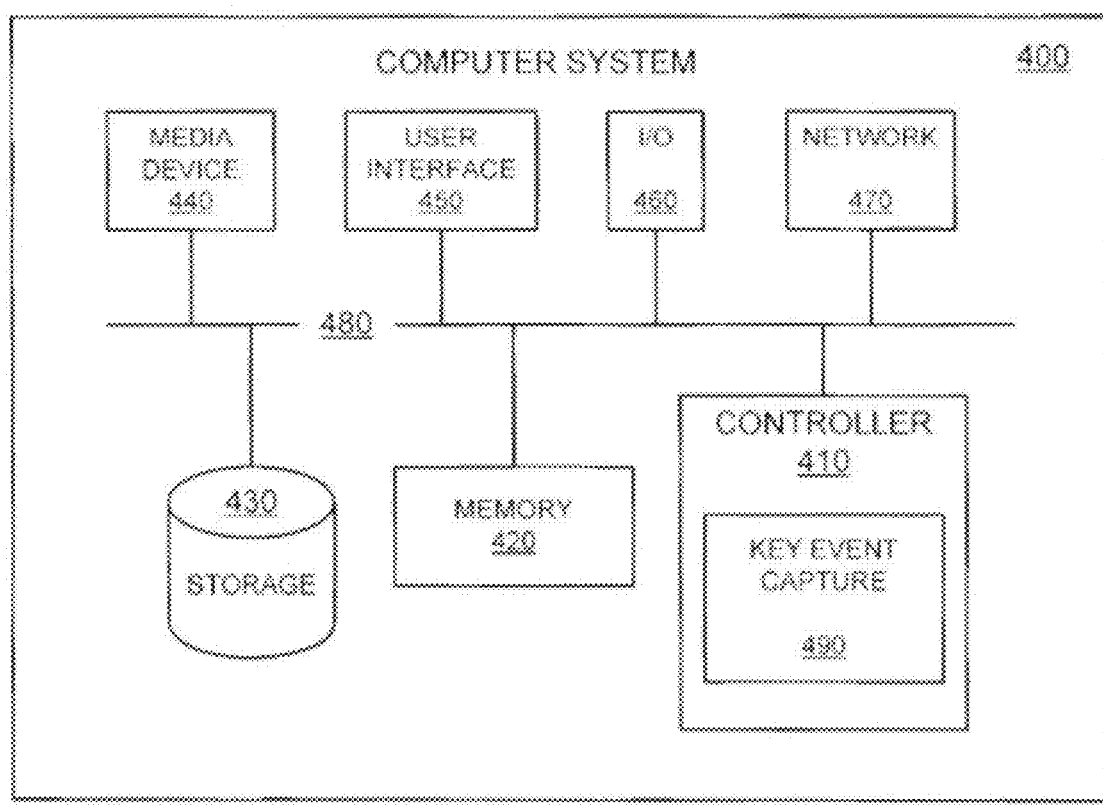
FIG. 4B is a functional block diagram illustrating the computer system hosting the key event capture system.

FIG. 4B is a functional block diagram illustrating the computer system 400 hosting the key event capture system 490. The controller 410 is a programmable processor and controls the operation of the computer system 400 and its components. The controller 410 loads instructions (e.g., in the form of a computer program) from the memory 420 or an embedded controller memory (not shown) and executes these instructions to control the system. In its execution, the controller 410 provides the key event capture system 490 as a software system. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data temporarily or long term for use by other components of the computer system 400, such as for storing data used by the key event capture system 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user. In one implementation, the user interface 450 includes a keyboard, a mouse, audio speakers, and a display. The controller 410 uses input from the user to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, the illustrated implementations discuss capturing/overriding playback key events in movie titles running under BD-J mode. However, in other implementations, the key events can be captured/overridden in other environments such as in interactive titles. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method of capturing playback key events to override a default behavior of key strokes during playback, the method comprising:
    receiving a user operation initiated by a user,
    wherein the user operation includes the playback key events that are prohibited during playback of a video disk inserted into a video player;
    receiving a notice from a user event manager that the playback key events comprise a non-default behavior of the key strokes which is being masked,
    wherein the user event manager is included in the video player;
    notifying the user that there are adverse consequences of overriding the prohibited playback key events during the playback by overriding the default behavior of the key strokes; and
    overriding the default behavior of the key strokes.

2. The method of claim 1, wherein the playback key events are captured for movie titles running under BD-J mode.

3. The method of claim 1, wherein the user operation comprises remote control commands including at least one of play, stop, fast forward, and skip push button actions.

4. The method of claim 1, wherein the user operation comprises advanced commands including at least one of changing an active subtitle language and changing an audio track.

5. The method of claim 1, wherein the notice that the non-default behavior of the key strokes is being masked is received from a listener of a user operation mask table.

6. The method of claim 5, wherein the user operation mask table is a table listing all allowed operations of the user.

7. The method of claim 1, wherein the non-default behavior of the key strokes comprises fast forward button pushes during a game play.

8. A system configured to capture playback key events to override a default behavior of key strokes during playback, the system comprising:
    a user event manager configured to manage the playback key events generated by a user,
    wherein the playback key events include key events that are prohibited during playback of a video disk inserted into a video player; and
    a key event capture module configured to receive a notice from a user event manager that the playback key events comprise a non-default behavior of the key strokes which is being locked out, and to notify the user that there are adverse consequences for overriding the prohibited playback key events during the playback by overriding the default behavior of the key strokes, the key event capture module further configured to instruct the user event manager to override the default behavior of the key strokes.

9. The system of claim 8, wherein the playback key events generated by a user comprise
    button pushes on a remote control.

10. The system of claim 9, wherein the playback key events comprise
    commands including play, stop, fast forward, skip.

11. The system of claim 9, wherein the playback key events comprise
    commands including changing the active subtitle language or audio track.

12. The system of claim 8, further comprising
    a playback control engine configured to control the playback, and to lock out the non-default behavior of the key strokes during the playback using a user operation mask table.

13. The system of claim 12, wherein the key event capture module receives the notice that a non-default behavior is being locked out from a listener of the user operation mask table.

14. The system of claim 8, wherein the non-default behavior of the key strokes comprises fast forward button pushes during a game play.

15. A non-transitory tangible storage medium storing a computer program for capturing playback key events to override a default behavior of key strokes during playback, the computer program comprising executable instructions that cause a computer to:
    receive a user operation initiated by a user,
    wherein the user operation includes the playback key events that are prohibited during playback of a video disk inserted into a video player;

receive a notice from a user event manager that the playback key events comprise a non-default behavior of the key strokes which is being masked,
wherein the user event manager is included in the video player;
notify the user that there are adverse consequences of overriding the prohibited playback key events during the playback by overriding the default behavior of the key strokes; and
override the default behavior of the key strokes.

16. The non-transitory tangible storage medium of claim 15, wherein the playback key events are captured for movie titles running under BD-J mode.

17. The non-transitory tangible storage medium of claim 15, wherein the notice that the non-default behavior of the key strokes is being masked is received from a listener of a user operation mask table.

18. The non-transitory tangible storage medium of claim 17, wherein the user operation mask table is a table listing all allowed operations of the user.

19. The non-transitory tangible storage medium of claim 15, wherein the non-default behavior of the key strokes comprises fast forward button pushes during a game play.

* * * * *